Patented Apr. 6, 1926.

1,580,059

UNITED STATES PATENT OFFICE.

GEORG LOCKEMANN, OF BERLIN, GERMANY.

MANUFACTURE OF 1-PHENYL-2,3-DIMETHYL-4-DIMETHYLAMINO-5-PYRAZOLONE.

No Drawing.      Application filed March 31, 1924.   Serial No. 703,289.

*To all whom it may concern:*

Be it known that I, GEORG LOCKEMANN, citizen of Germany, residing at Berlin, Germany, have invented a new and useful Improvement in the Manufacture of 1-Phenyl-2,3-Dimethyl-4-Dimethylamino-5-Pyrazolone, of which the following is a specification.

In order to produce 1-phenyl-2,3-dimethyl-4-dimethylamino-5-pyrazolone it was hitherto necessary to make the corresponding 4-amino compound by reduction of 1-phenyl-2,3-dimethyl-4-nitroso-5-pyrazolone and to transform the free 4-amino compound, the purification of which is very troublesome, into the 4-dimethyl-amino compound.

My invention relates to a process by which the latter compound is obtained from the 4-nitroso compound in one operation at a good yield. The process consists in treating the 1-phenyl-2,3-dimethyl-4-nitroso-5-pyrazolone in presence of formaldehyde with reducing agents, for instance with a suitable metal, preferably zinc or iron, in an acid medium (mineral acids or organic acids). The final product has the following structural formula:—

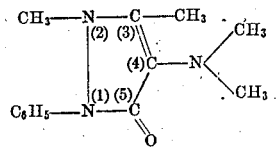

The term "formaldehyde" not only includes formaldehyde in the ordinary but also in the polymerized state.

*Example 1 (the parts being by weight).*

22 parts of 1-phenyl-2,3-dimethyl-4-nitroso-5-pyrazolone are suspended in 100 parts of a 50 percent solution of acetic acid and for 15 minutes vigorously stirred at about 40° C. while 30 parts of zinc powder gradually are introduced, preferably in presence of some copper sulphate. Then gradually 25 parts of glacial acetic acid, 80 parts of a 10 percent solution of formaldehyde and 40 parts of zinc powder are added while the temperature is slowly increased. The stirring is continued for one hour and a quarter. Then the mass is rendered alkaline, the 1-phenyl-2,3-dimethyl-4-dimethylamino-5-pyrazolone formed is separated by means of benzene and recrystallized from ligroin or the like. This reaction may be expressed by the following equation:

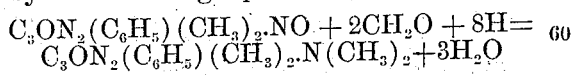

Instead of a formaldehyde solution polymerized formaldehyde (paraformaldehyde, trioxymethylene etc.) may also be used.

It is even possible to start with the 1-phenyl-2,3-dimethyl-5-pyrazolone and to obtain in one operation the 1-phenyl-2,3-dimethyl-4-dimethylamino-5-pyrazolone by treating the starting product with a nitrite in an acid solution and then causing reducing agents in presence of formaldehyde to act on the 1-phenyl-2,3-dimethyl-4-nitroso-5-pyrazolone formed without separating it from the reaction mixture.

*Example 2 (the parts being by weight).*

3.8 parts of 1-phenyl-2,3-dimethyl-5-pyrazolone are dissolved in 10 parts of a 40 percent sulphuric acid and 50 parts of water. Then a solution of 1.55 parts of sodium nitrite in 15 parts of water is gradually added while cooling and stirring. The green colored 1-phenyl-2,3-dimethyl-4-nitroso-5-pyrazolone separates. Thereupon 40 parts of a 40 percent solution of sulphuric acid are added and then while cooling 6 parts of zinc powder and some copper sulphate are gradually added. The stirring is continued until the solution is almost discolored. The mass is then heated to about 70° C. and gradually 16 parts of a 10 percent solution of formaldehyde and 12 parts of zinc-powder are added with some copper sulphate. The stirring is continued until there is only a slight evolution of hydrogen. The mass is then filtered and the filtrate made alkaline. The 1-phenyl-2,3-dimethyl-4-dimethylamino-5-pyrazolone is separated with benzene and purified by recrystallization. These reactions take place according to the following equations:

(a) 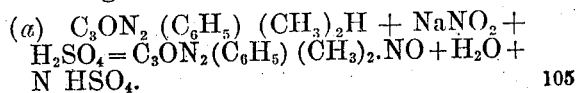

(b) 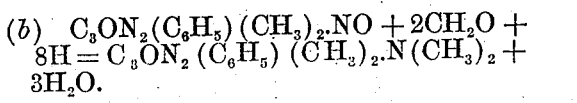

It is to be understood that I do not intend to be limited to the particular kind and sequence of operations nor to the proportion described in the examples, for obvious modifications will occur to a person skilled in the art.

I claim as my invention.

1. The process of making 1-phenyl-2.3-dimethyl-4-dimethylamino-5-pyrazolone which consists in causing hydrogen liberating agents to react on 1-phenyl-2.3-dimethyl-4-nitroso-5-pyrazolone in presence of formaldehyde.

2. The process of making 1-phenyl-2.3-dimethyl-4-dimethylamino-5-pyrazolone which consists in causing a metal having the property in an acid medium of liberating hydrogen, to react in an acid medium on 1-phenyl-2.3-dimethyl-4-nitroso-5-pyrazolone in presence of formaldehyde, then rendering the reaction mixture alkaline and separating the 1-phenyl-2.3-dimethyl-4-dimethylamino-5-pyrazolone formed.

3. The process of making 1-phenyl-2.3-dimethyl-4-dimethylamino-5-pyrazolone which consists in causing zinc powder in an acid medium to react on 1-phenyl-2.3-dimethyl-4-nitroso-5-pyrazolone in presence of formaldehyde, then rendering the solution alkaline and separating the 1-phenyl-2.3-dimethyl-4-dimethylamino-5-pyrazolone formed.

4. The process of making 1-phenyl-2.3-dimethyl-4-dimethylamino-5-pyrazolone which consists in causing hydrogen liberating agents in presence of formaldehyde to act on the reaction mixture resulting from the manufacture of 1-phenyl-2.3-dimethyl-4-nitroso-5-pyrazolone from the action of nitrous acid upon 1-phenyl-2.3-dimethyl-5-pyrazolone.

5. The process of making 1-phenyl-2.3-dimethyl-4-dimethylamino-5-pyrazolone which consists in causing a metal having the property in an acid medium of liberating hydrogen, to react in an acid medium and in presence of formaldehyde on the reaction mixture resulting from the manufacture of 1-phenyl-2.3-dimethyl-4-nitroso-5-pyrazolone from the action of nitrous acid upon 1-phenyl-2.3-dimethyl-5-pyrazolone.

6. The process of making 1-phenyl-2.3-dimethyl-4-dimethylamino-5-pyrazolone which consists in causing zinc powder in an acid medium and in presence of formaldehyde to act on the reaction mixture resulting from the manufacture of 1-phenyl-2.3-dimethyl-4-nitroso-5-pyrazolone from the action of nitrous acid upon 1-phenyl-2.3-dimethyl-5-pyrazolone.

7. In the process of reducing 1-phenyl-2.3-dimethyl-4-nitroso-5-pyrazolone the step which consists in performing the reduction in presence of a catalyzer and with the addition of formaldehyde.

8. In the process of reducing 1-phenyl-2.3-dimethyl-4-nitroso-5-pyrazolone the step which consists in performing the reduction in presence of some copper sulphate and with the addition of formaldehyde.

In testimony whereof I have hereunto set my signature.

GEORG LOCKEMANN.